| | | | | | | | | |
|---|---|---|---|---|---|---|---|---|
| $A_{00}^0$ | | | | $A_{04}^0$ | | | | • |
| $A_{00}^0$ | $A_{01}^1$ | | | $A_{04}^0$ | $A_{05}^1$ | | | • |
| $A_{00}^0$ | $A_{01}^1$ | $A_{02}^2$ | | $A_{04}^0$ | $A_{05}^1$ | $A_{06}^2$ | | • |
| $A_{00}^0$ | $A_{01}^1$ | $A_{02}^2$ | $A_{03}^3$ | $A_{04}^0$ | $A_{05}^1$ | $A_{06}^2$ | • | • |
| $A_{00}^4$ | $A_{01}^1$ | $A_{02}^2$ | $A_{03}^3$ | $A_{04}^4$ | $A_{05}^1$ | $A_{06}^2$ | • | • |
| $A_{00}^4$ | $A_{01}^5$ | $A_{02}^2$ | $A_{03}^3$ | $A_{04}^4$ | $A_{05}^5$ | $A_{06}^2$ | • | • |

*Inventor*
K. Maezono
By Arthur M. Lieberman
Agent

Inventor
K. Maezono
By Arthur M. [signature]
Agent

Nov. 17, 1964 KENICHI MAEZONO 3,157,745

BAND WIDTH COMPARISON TRANSMISSION SYSTEM FOR RECURRING SIMILAR SIGNALS UTILIZING SELECTIVE PULSE INDICATIONS

Filed June 20, 1961 6 Sheets-Sheet 3

Inventor
K. Maezono
By [signature]
Agent

Inventor
K. Maezono
By Arthur M. Lieberman
Agent

Nov. 17, 1964 KENICHI MAEZONO 3,157,745

BAND WIDTH COMPARISON TRANSMISSION SYSTEM FOR RECURRING SIMILAR SIGNALS UTILIZING SELECTIVE PULSE INDICATIONS

Filed June 20, 1961 6 Sheets-Sheet 5

Inventor
K. Maezono
By [signature]
Agent

Inventor
K. Maezono
By [signature]
Agent

United States Patent Office 3,157,745
Patented Nov. 17, 1964

3,157,745

BAND WIDTH COMPARISON TRANSMISSION SYSTEM FOR RECURRING SIMILAR SIGNALS UTILIZING SELECTIVE PULSE INDICATIONS

Kenichi Maezono, Minato-ku, Tokyo, Japan, assignor to Nippon Electric Company, Limited, Tokyo, Japan, a corporation of Japan Filed June 20, 1961, Ser. No. 118,290
Claims priority, application Japan, June 21, 1960, 35/29,032
6 Claims. (Cl. 179—15.55)

This invention relates to a system for compressing a transmission signal band for a signal with an approximately constant period and wave form, such as an audio signal or a TV video signal.

At present, in transmitting an audio signal or a TV video signal through a channel, the signal requires a definite cleared frequency band width, below which the transmitted signal quality deteriorates.

However, in order to use the channel effectively and to record the signal on a magnetic recorder easily, it is of great advantage, by utilizing the signal characteristics, to compress the transmission frequency band width without deteriorating the signal quality.

Hence, the object of this invention is to utilize the inherent characteristics of recurring similar signals to allow increased data transmission through a given medium.

The above mentioned and other features and objects of this invention and the manner of attaining them will become more apparent and the invention itself will best be understood by reference to the following description of two embodiments of the invention taken in conjunction with the accompanying drawings wherein.

Figures 1, 6:
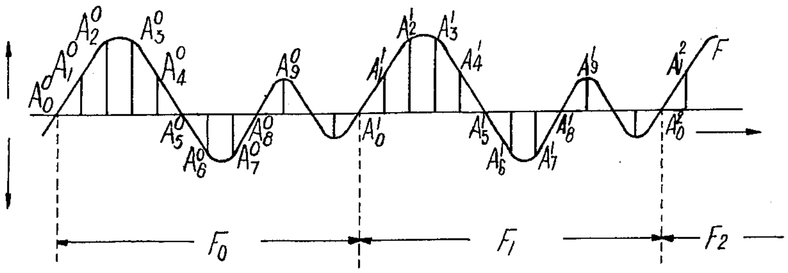
FIG. 1 illustrates a periodic signal.
FIGS. 5 and 6 illustrates the principles shown in FIGS. 2 and 4 respectively applied to PCM.
Figure 2:
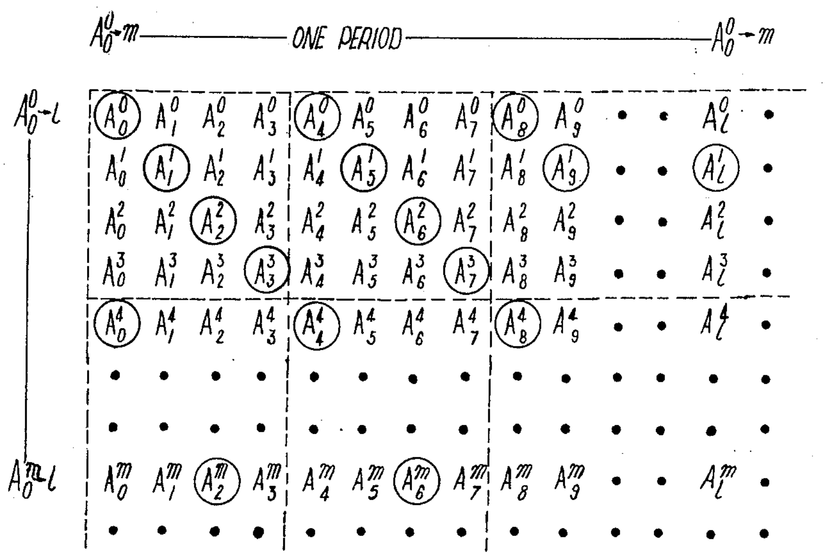
FIG. 2 shows a matrix for employing the principle of the band compression of this invention.
Figure 3:
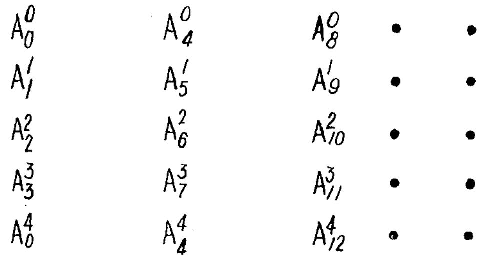
FIG. 3 illustrates the matrix coordinates of the band-compressed signal of FIG. 2.
Figure 4:
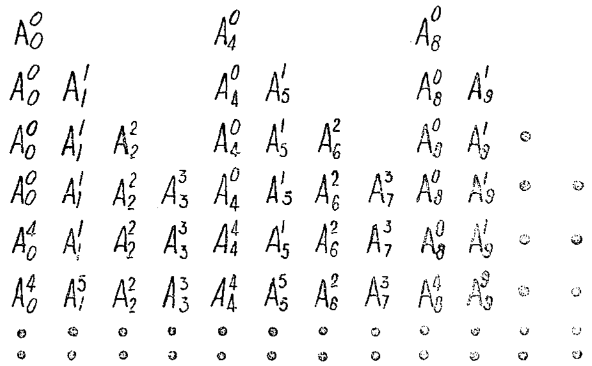
FIG. 4 illustrates the principle of reproducing a signal synthesizing the original signal from the band-compressed signal.
Figure 5:
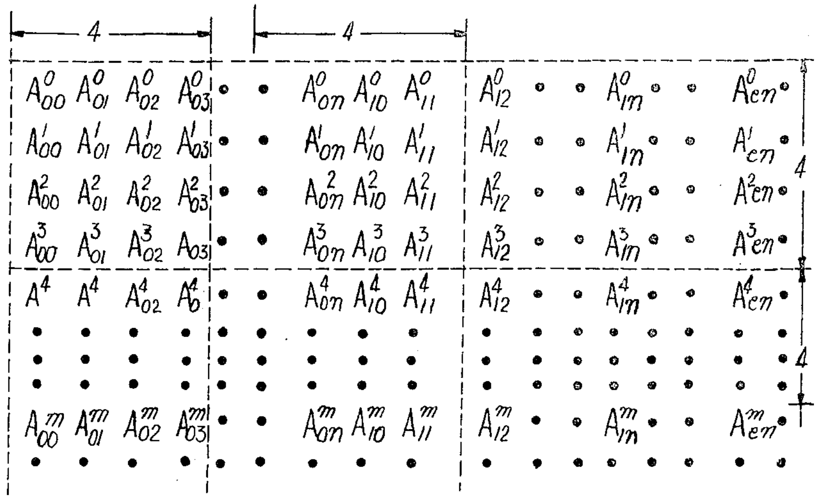
Figure 7A:
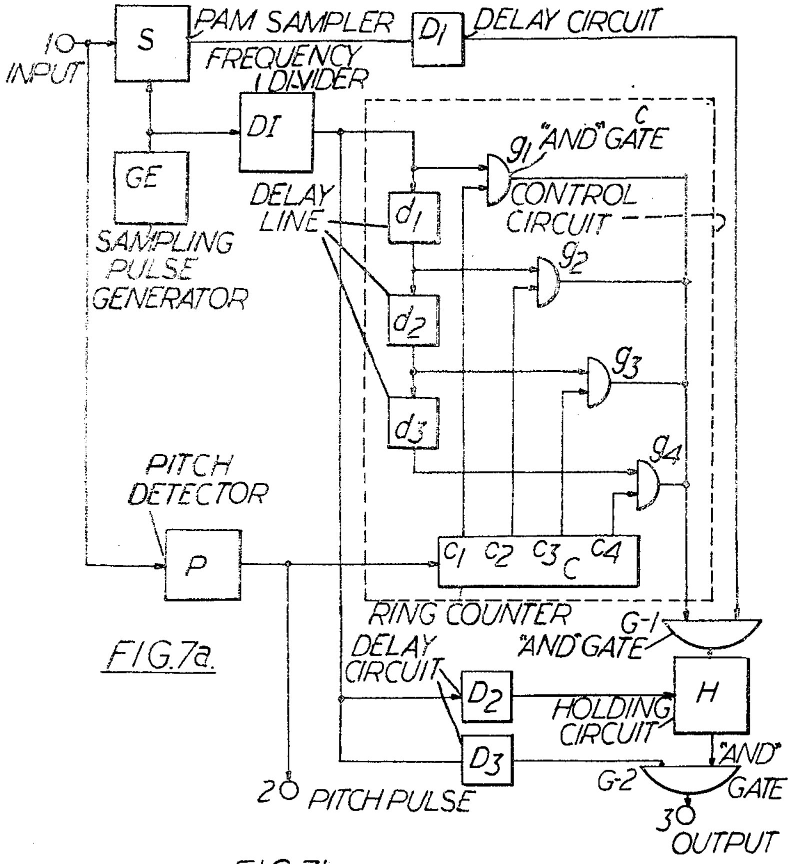
Figure 7B:
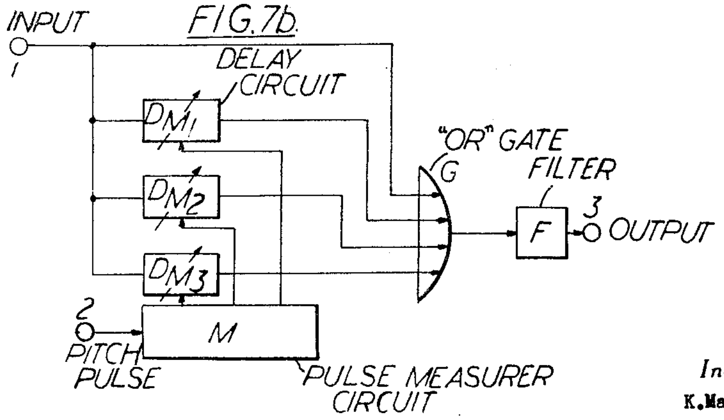
Figure 8A:
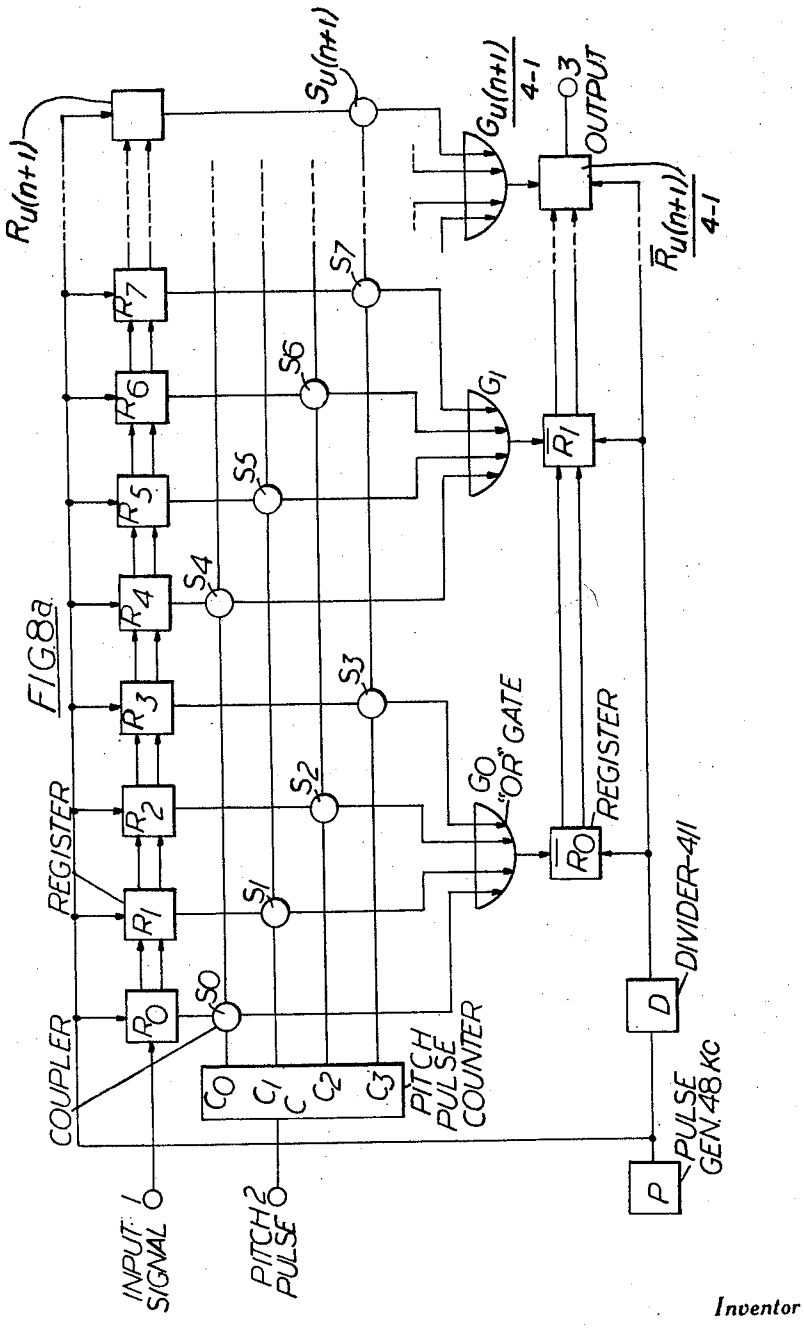
Figure 8B:
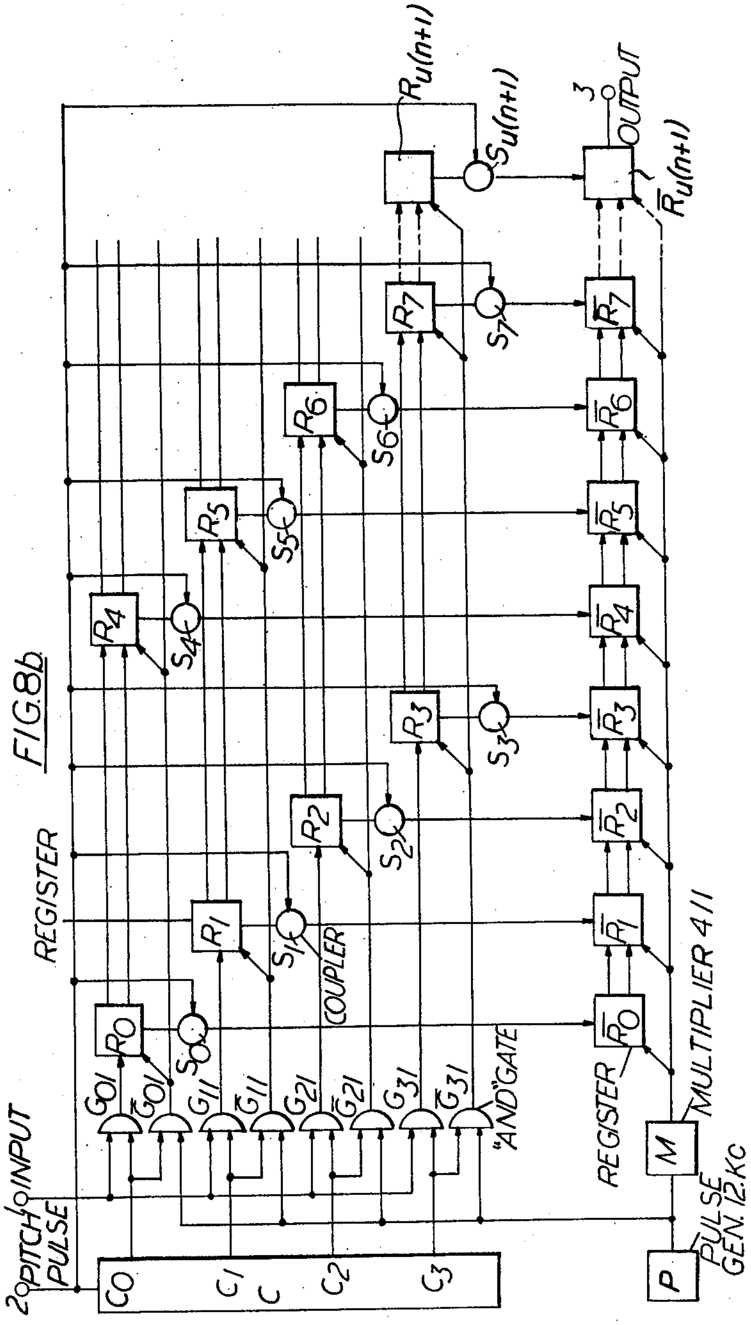

FIGS. 7*a* and 7*b* show schematically the send and receive circuitry respectively for carrying out the inventive concept for PAM shown in FIGS. 2, 3 and 4;

FIGS. 8*a* and 8*b* show schematically the send and receive circuitry respectively for carrying out the inventive concept for PCM shown in FIGS. 5 and 6.

A period in which an audio signal of approximately the same wave form is repeated is called a pitch period. In a TV video signal, approximately a same wave form appears for every horizontal synchronous signal and vertical synchronous signal. In FIG. 1 showing a signal F, whose approximate wave form is repeated in a period P, let the wave form for each period be $F_0, F_1 \ldots F_m$. Sampling F, the amplitudes for each sampling point of $F_0, F_1, F_2, \ldots F_m$ form the PAM wave form $$A_0^0\ A_1^0\ A_2^0 \ldots A_l^0 \ldots \text{for } F_0$$
$$A_0^1\ A_1^1\ A_2^1 \ldots A_l^1 \ldots \text{for } F_1$$
$$A_0^2\ A_1^2\ A_2^2 \ldots A_l^2 \ldots \text{for } F_2$$

and $$A_0^m\ A_1^m\ A_2^m \ldots A_l^m \ldots \text{for } F_m$$

as shown in FIG. 1. In FIG. 2, the amplitudes of the wave form sampling for one period are arranged in one row, and those for sampling at $F_0, F_1, F_2, \ldots F_m$, with the same subscripts "*l*," in one column. From this arrangement, it may be seen that there is a strong relation, from the nature of the signal F, among the sampling amplitudes, in the same column of adjacent rows, or if *n* is an appropriate integer among $$A_l^m\ A_l^{m+1}\ A_l^{m+2} \ldots A_l^{m+n}$$

In other words, a change in the same column is much slower compared with that in the same row.

The matrix of FIG. 2 is then divided into small square matrices. In this example, 4 rows and 4 columns have been selected as shown by dotted lines. Four sampling amplitudes are selected represented by elements determined by using all the positions of rows and columns in the small square matrix only once. For instance, in FIG. 2, the value of the elements on the diagonal of the small square matrix enclosed by the square are used. The sampling amplitudes enclosed by the square are sampled and sent to the output terminal. The sampling period of this sending signal is reduced to ¼ of that of the input signal F, and the aim of band compression is attained. FIG. 3 shows the output signal. Since the amplitude of the sampling points which have not been sent out in FIG. 2 have an extremely strong relation to those specific sampling points sent out, a signal close to the original one can be reproduced by filling in the sampling points which are not transmitted with a value deduced from the amplitudes of the transmitted sampling points. FIG. 4 shows an example of the method.

In this method, an amplitude at a sampling point where no transmission occurs, is substituted by the amplitude of the sampling point where transmission occurred at the nearest time in the column.

In FIG. 2, 4 was chosen as the number of rows and columns of the small matrix, but, in general, 2 or a larger number *k* can be chosen as the number of the rows and columns to perform the similar operation. In this case, the reproducing can be performed similarly to when $k=4$.

Furthermore, in the above band width compression system, if the amplitude of each sampling point, through PCM encoding, is binary coded to $$A_{l0}^m\ A_{l1}^m\ A_{l2}^m \ldots A_{ln}^m$$

of the amplitude $A_l^m$ at the sampling point, FIG. 2 is redrawn as FIG. 5. In this system also there is a strong relation among adjacent elements of each column, and the change of amplitude of each column is slow. In this case, it is possible to apply the same band compression system as the case of FIG. 3 by dividing the main matrix into small matrices of *k* rows and *k* columns. FIG. 5 shows an arrangement of matrices with $k=4$.

With the above method, the band compression was performed by using the amplitude of the element determined by using all the positions of each row and column of the small square matrix of *k* rows and *k* columns only once; but it can be further extended to a band compression system in which only that amplitude is transmitted or stored which is represented by the element determined by using all the positions of the columns of the small square matrix of *k* rows and *k* columns once, choosing proper positions of rows and allowing their repetition. For the purpose of convenience the signal elements $A_0^0$ etc. are designated as pulse indications to cover, for example, single PAM pulses or pulse code groups.

A description will now be made referring to an embodiment in which PAM signal has been applied corresponding to FIGS. 2, 3, and 4. FIGS. 7*a* and 7*b* illustrate a transmitting and receiving station respectively according to the present invention. Let it be assumed that the input signal for the present embodiment is an audio signal. Let the sampling frequency at the transmitting terminal station be 8 kc. and GE be the sampling pulse generator.

An audio signal entering into the transmitting terminal station through input terminal 1 is branched out into two parts, one part of which enters into circuit S (S is a PAM sampler, an 8 kc. sampling audio PAM waveform being shaped by this circuit), while the other part enters into the pitch detector P.

P detects the pitch waveform of an audio signal, whereby a series of pitch pulses corresponding to the wave pitch is produced. Circuit DI is a frequency divider which transforms the input 8 kc. pulses into 2 kc. pulses. Circuit C is a control circuit for determining the instant at which each of the PAM pulses $A_0^0$, $A_4^0$, $A_8^0$ . . ., and $A_1^1$, $A_5^1$ . . . $A_2^2$, $A_6^2$ . . . (FIG. 2) is to be transmitted by using the 2 kc. pulses and the pitch pulses. The circuit C consists of delay lines $d_1$, $d_2$, $d_3$ each having a delay time interval 125 micro-seconds; a ring counter C for counting pitch pulses and having output terminals 1, 2, 3 and 4; and four "AND" gate circuits *g*–1, *g*–2, *g*–3, and *g*–4. The ring counter output voltage shifts from output terminal $C_1$ to $C_2$, from $C_2$ to $C_3$, from $C_3$ to $C_4$, from $C_4$ back to $C_1$ each time a pitch pulse is introduced thereto. The output waveforms at the junction points *g*–1, *g*–2, *g*–3 and *g*–4 correspond to those at the positions in FIG. 2 enclosed by the rectangle. The output determines the instant at which the PAM waveform is sent out and further, when both the PAM waveform in the output of $D_1$ and the output waveform of the C circuit enter into the "AND" gate circuit G–1, the output waveform of G–1 becomes the pulses to be transmitted. Since the output waveform of G–1 has been phase-modulated, the output waveform of G–1 is translated into a correct PAM signal with 2 kc. period as shown in FIG. 3 by the holding circuit H, controlled by a 2 kc. output pulse of the circuit DI and the "AND" gate circuit G–2, for transmission to the transmitting output terminal 3. On the other hand, pitch pulses are also transmitted to the receiving terminal station through the output terminal 2. The functions of delay circuits $D_1$, $D_2$, and $D_3$ are to compensate for the delay times among various signals.

At the receiving terminal station as shown in FIG. 7*b*, the PAM audio signal from the transmitting terminal station is branched out into four circuits through terminal 1, one being directly connected to the "OR" gate G while the remaining three are coupled through $D_{M1}$, $D_{M2}$ and $D_{M3}$. On the other hand, the pitch pulses from the transmitting terminal station are introduced into circuit M through the terminal 2, at the receiving terminal station. The circuit M is provided with the function of adjusting the delay amount of each of delay circuits $D_{M1}$, $D_{M2}$ and $D_{M3}$ in accordance with the pitch period. The delay time intervals of $D_{M1}$, $D_{M2}$ and $D_{M3}$ are controlled by the circuit M so that $D_{M1}$, $D_{M2}$, and $D_{M3}$ may have respectively one-pitch, two-pitch and three-pitch time intervals.

By the function of the receiving terminal station, the PAM signal as shown in FIG. 4 is available on the output side of circuit G from the input PAM signal as shown in FIG. 3. The PAM signal enables a reproduced audio signal extremely akin to the human voice to be obtained at the receiving terminal station terminal 3 through the 4 kc./s. cut-off frequency low-pass filter F.

Another example of a band compression communication system, embodying the features of this invention and corresponding to a PCM signal as shown in FIGS. 5 and 6 will now be explained hereunder. FIG. 8*a* shows the construction diagram of the sending end station of this communication system, and FIG. 8*b* that of the receiving end station of this communication system. Here the input signal is a PCM audio signal of an 8 kc. sampling period represented by a 6-unit binary code. In the sending station, 1 is the input terminal of the input signal. The pitch pulse which is synchronized with the pitch period of the input signal is drawn from *z*. The number of sampling pulses, each represented by a code group may be designated *u*. $R_0$, $R_1$, $R_2$, . . . $R_{u(n+1)}$ are registers forming, as a whole a shift register whose shift pulse is controlled by a 48 kc. pulse generated by the oscillator P in synchronism with the PCM sampling pulse. This shift register stores the PCM pulses of one pitch period from $R_0$ towards $R_{u(n+1)}$ in order, which compose memory elements in the row direction of FIG. 5. For the sake of convenience, the illustration is such that the PCM pulses are supplied to the first register $R_0$ although they must be supplied to the last register and the desired band-compressed output pulses must be taken out from the first shift register $\overline{R}_0$ in order to band-compress the PCM pulses in the manner shown in FIGS. 5 and 6. The $R_0$, $R_1$ . . . $R_{u(n+1)}$ registers are divided into groups of four having registers ($R_0$, $R_1$, $R_2$, $R_3$), ($R_4$, $R_5$, $R_6$, $R_7$), ($R_8$, $R_9$, $R_{10}$, $R_{11}$) . . . which correspond to the small matrices of FIG. 5 having the number of columns, $K=4$. The groups are connected to the "or" gates of $$G_0\ G_1\ G_2 \cdots \frac{G_{u(n+1)}}{4}-1$$

(for simplicity, $$\frac{u(n+1)}{4}$$

is considered to be an integer) through $S_1$, $S_2$, $S_3$, . . . $S_{u(n+1)}$.

$$G_0\ G_1\ G_2 \cdots \frac{G_{u(n+1)}}{4}-1$$

are connected to the shift register consisting of $$\overline{R}_0\ \overline{R}_1 \cdots \frac{\overline{R}_{u(n+1)}}{4}-1$$

registers. The couplers $S_0$ $S_1$ $S_2$ . . . $S_{u(n+1)}$, when a pulse is given by the output of the counter C, function to shift the contents corresponding to the shift register $R_0$ $R_1$ . . . $R_{u(n+1)}$ to the register $$\overline{R}_0\ \overline{R}_1 \cdots \frac{\overline{R}_{u(n+1)}}{4}-1$$

On the other hand, every time the pitch pulse comes to the terminal 2 the output signal of the pitch pulse counter C which has a function to indicate the position in the rows of the small matrix is shifted to the terminal $C_1$, $C_2$, $C_3$, sequentially from the terminal O, returning to the terminal $C_0$ and repeating this procedure.

Of the PCM signals which have entered the shift register $R_0$ $R_1$ $R_2$ . . . $R_{u(n+1)}$, the contents of the PCM signal corresponding to the first row of FIG. 3 is shifted to $$\overline{R}_0,\ \overline{R}_1 \cdots \frac{\overline{R}_{u(n+1)}}{4}-1$$

from $R_0$ $R_4$ $R_8$ . . . through $S_0$ $S_4$ $S_8$ . . . and the gate $$G_0\ G_1 \cdots \frac{G_{u(n+1)}}{4}-1$$

by the O terminal pulse of the counter C driven by the first pitch pulse. After this operation, the shift register $R_0$ $R_1$ $R_2$ . . . $R_{u(n+1)}$ is reset by the action of the new PCM signal being stored. (For simplicity, this has been omitted from the figure, but it may obviously be done by any of the well-known methods.) The contents of the shift register $$\overline{R}_0\ \overline{R}_1\ \overline{R}_2 \cdots \frac{\overline{R}_{u(n+1)}}{4}-1$$

is sent out to the output terminal 3 by 12 kc. shift pulses which are obtained by the frequency division, in the ratio of 4/1 of the output frequency of the 48 kc. generator. The pulse appearing at the terminal $C_1$ of the counter C due to the second pitch pulse shifts the contents of the registers $R_1$ $R_5$ $R_9$ . . . to the shift register $\overline{R}_0$ $\overline{R}_1$ $\overline{R}_2$ . . ., the third pitch pulse shifts the contents of $R_2$, $R_6$, $R_{10}$ . . ., the fourth pitch pulse shifts the contents of $R_3$, $R_7$, $R_{11}$ . . ., and the fifth pitch pulse again shifts the contents of the registers $R_0$ $R_4$ $R_8$ to the shift register $\overline{R}_0$ $\overline{R}_1$ $\overline{R}_2$ . . . . This process continues as long as the pitch pulse, which is separately transmitted from the sending end station to the receiving end station, enters the counter C.

At the receiving end station, FIG. 8b, the 4 sets of shift registers $R_0$ $R_4$ $R_8$ . . . , $R_1$ $R_5$ $R_9$ . . . , $R_2$ $R_6$ $R_{10}$ . . ., and $R_3$ $R_7$ $R_{11}$ . . ., are connected to the output terminals $C_0$, $C_1$, $C_2$, and $C_3$ of the counter C, and the input terminal 1 of the receiving end station, through "and" gates $G_{01}$ $G_{11}$ $G_{21}$ $G_{31}$. Also each register $R_1$ $R_2$ $R_3$ . . . $R_{u(n+1)}$ is coupled to the other shift registers $\overline{R}_0$ $\overline{R}_1$ $\overline{R}_2$ . . . $\overline{R}_{u(n+1)}$ through couplers $S_1$ $S_2$ $S_3$ . . . $S_{u(n+1)}$. The function of the couplers $S_1$ $S_2$ $S_3$ . . . $S_{u(n+1)}$ is the same as that at the sending end station. P is a 12 kc. pulse generator synchronized with the 12 kc. shift pulse of the sending end station, and supplies the shift registers $R_0$ $R_4$ $R_8$ . . ., $R_1$ $R_5$ $R_9$ . . ., $R_2$ $R_6$ $R_{10}$ . . . and $R_3$ $R_7$ $R_{11}$ . . . with shift pulses through the "and" gates $\overline{G}_{01}$ $\overline{G}_{11}$ $\overline{G}_{21}$ $\overline{G}_{31}$. On the other hand, the same 12 kc. pulse undergoes a frequency multiplication of 4 by the multiplier M becoming a 48 kc. pulse which is applied to the shift register $\overline{R}_0$ $\overline{R}_1$ $\overline{R}_2$ . . . $\overline{R}_{u(n+1)}$ as a shift pulse. Every time a pitch pulse is sent from the sending end station to the terminal 2, the pulse appears at one of the output terminals $C_0$, $C_1$, $C_2$, $C_3$ of the counter C similarly to the operation of the counter C of the sending end station. $\overline{G}_{01}$ $\overline{G}_{11}$ $\overline{G}_{21}$ $\overline{G}_{31}$ pass the 12 kc. shift pulse only when the counter C is supplying these "and" gates with a pulse, thus supplying the shift register with a shift pulse. The band compressed PCM signal, sent from the sending end station, enters the shift register from the input terminal 1, through the sequentially opening "and" gates $G_{01}$, $G_{11}$, $G_{12}$, and $G_{13}$.

When gate $G_{01}$ is open, the PCM signal is supplied to the shift register $R_0$ $R_4$ $R_8$ . . . The next pitch pulse opens the gate $G_{11}$ and stores the successive signal in $R_1$ $R_5$ $R_9$ . . .

Thus, after the signal is stored up to the shift register $R_3$ $R_7$ $R_{11}$ . . ., the next signal resets $R_0$ $R_4$ $R_8$ . . ., storing a new signal of 1 pitch spacing. On the other hand, for every one pitch pulse, the contents of $R_0$ $R_1$ $R_2$ . . . $R_{u(n+1)}$ are transmitted to $\overline{R}_0$ $\overline{R}_1$ $\overline{R}_2$ . . . $\overline{R}_{u(n+1)}$ whose contents become the signals corresponding to FIG. 6, and are sent out from the output terminal 3.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A system for producing a series of band-compressed output pulse indications representative of an input signal having a form approximately recurring in regular periods, said signal being represented by a first train of $m$ pulse indications containing a predetermined number of groups of K of said pulse indications, comprising:

(a) means for selecting the first pulse indication from each of said groups during a first regular period, (b) means for selecting the next succeeding pulse indications successively during the following $K-1$ regular periods, (c) means for transmitting the selected pulse indications, and (d) means for successively repeating similar selection and transmission of pulse indications for successive groups of K regular periods.

2. A system according to claim 1, wherein said pulse indications are each single amplitude modulated pulses and wherein said selecting means comprises:

(a) means for applying all said indications to a common AND gate, (b) means for applying a series of pulses spaced from one another by a time period equal to the sum of said regular period and the transmission time of K successive pulse indications, (c) and an output lead coupled to said AND gate.

3. A system according to claim 1, wherein said pulse indications are each groups of code modulated pulses and wherein said selecting means comprises:

(a) means for applying said pulse code groups to a first shift register consisting of $n$ registers, (b) means coupling each group of K of said first registers to an individual register of a second shift register through gating means, (c) means operating said first shift register to shift the pulses at a rate of $pr$, where $p$ is the number of pulses in each code group and $r$ is the repetition rate of the pulse groups, and for operating the second shift register to shift pulses at a rate of $pr/K$, (d) means for operating said gating means in successive sequence for each of said K groups in response to successive of said regular periods, and (e) an output circuit coupled to the last register of said second shift register.

4. A system according to claim 1, wherein said pulse indications are single amplitude modulated pulses, comprising:

(a) a source of sampling pulses of a given pulse repetition rate, (b) a pitch detector for producing a series of pitch pulses of a repetition rate of the recurrence of said regular periods, (c) sampler circuit, (d) means for applying the input signal and said sampling pulses to said sampler circuit to produce said $m$ pulse indications and to said pitch detector, (e) said means for selecting, comprising:

(1) a frequency divider for dividing pulses from said sampling source by K, (2) $K-1$ delay devices each with a delay equal to K repetitions of said sampling pulses connected in tandem to the output of said frequency divider, (3) counting means coupled to the output of said pitch detector having K outputs successively operative in response to successive of said pitch pulses, (4) K gating means respectively responsive to simultaneous application of the frequency divided pulses from successive connections of said tandem connected delay devices and successive pulses from said counting means, connected to a common output lead, (5) an output gate, (6) and means for applying the output pulses from said sampler circuit and said common output lead to said output gate to release to said output sampled pulses coinciding in time with the pulses in said common output lead.

5. A system according to claim 1 further comprising means under control of pulses from said divider for releasing the pulses from said output gate for transmission.

6. A system according to claim 1 wherein said input signal comprises a series of pulse code groups, each group forming said pulse indications, said means for selecting comprising:

(a) $n$ tandem connected signal registers forming a first shift register, (b) means for applying said input signal to the first of said registers, (c) a pulse source producing pulses at a repetition rate equal to the repetition rate of said pulse code groups multiplied by the number of pulse code elemens, having its output coupled in parallel to each register to effect shifting of the stored pulse code groups to successive registers, (d) a counting circuit responsive to pulses of said regular period repetition rate having K successively operative outputs, (*e*) a second series of tandem connected registers one for each K of said first named registers, forming a second shift register, (*f*) gate circuits coupled to the output of each of said first-named registers, (*g*) connections from respective of said counting circuit outputs to every Kth of said gate circuits associated with successive of said first-named registers, (*h*) $n/K$ or gates, the respective outputs being coupled to successive registers of said second series of registers, (*i*) means connecting successive groups of K couplers to successive of said "or" gates to transfer stored signals from the registers of said first series to the registers of said second series, (*j*) means for selecting every Kth pulse from the output of said pulse source and applying the selected pulses in parallel to said second registers, to effect a serial shift of said transferred signal groups, (*k*) and an output lead coupled to the first register of said second series.

References Cited in the file of this patent

UNITED STATES PATENTS

| | | |
|---|---|---|
| 2,603,714 | Meacham | July 15, 1952 |
| 2,619,636 | Veaux | Nov. 25, 1952 |
| 2,645,770 | Veaux | July 14, 1953 |
| 2,650,949 | Veaux | Sept. 1, 1953 |
| 2,759,998 | Labin et al. | Aug. 21, 1956 |